(12) United States Patent
Xing et al.

(10) Patent No.: US 8,122,170 B2
(45) Date of Patent: Feb. 21, 2012

(54) ADAPTIVE KEYBOARD LAYOUT MAPPING

(75) Inventors: Jingxia Xing, Beijing (CN); Shengyong Li, Beijing (CN); Dinghao Zeng, Beijing (CN); Jun Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 169 days.

(21) Appl. No.: 12/482,472

(22) Filed: Jun. 11, 2009

(65) Prior Publication Data

US 2010/0318695 A1 Dec. 16, 2010

(51) Int. Cl.
*H03M 11/00* (2006.01)
(52) U.S. Cl. ............... 710/67; 710/62; 710/65; 710/66; 341/23; 341/26
(58) Field of Classification Search .................. None
See application file for complete search history.

(56) References Cited

U.S. PATENT DOCUMENTS

| | | | |
|---|---|---|---|
| 5,523,754 A | 6/1996 | Eisen et al. | |
| 5,623,261 A * | 4/1997 | Rose | 341/26 |
| 6,014,616 A * | 1/2000 | Kim | 704/8 |
| 6,349,337 B1 * | 2/2002 | Parsons et al. | 709/227 |
| 6,429,793 B1 * | 8/2002 | Paolini | 341/22 |
| 6,456,277 B1 * | 9/2002 | Satoh et al. | 345/168 |
| 6,469,713 B2 * | 10/2002 | Hetherington et al. | 715/740 |
| 6,512,467 B1 * | 1/2003 | Hanko et al. | 341/22 |
| 7,130,891 B2 * | 10/2006 | Bernardin et al. | 709/218 |
| 7,193,615 B2 | 3/2007 | Kim et al. | |
| 7,502,729 B2 * | 3/2009 | Dayar et al. | 703/27 |
| 7,652,660 B2 * | 1/2010 | Chen et al. | 345/156 |
| 2005/0102432 A1 | 5/2005 | Winslow | |
| 2007/0124372 A1 * | 5/2007 | Liu et al. | 709/204 |
| 2008/0165035 A1 * | 7/2008 | Bhella et al. | 341/23 |
| 2008/0177920 A1 * | 7/2008 | Dennis | 710/200 |
| 2009/0070404 A1 * | 3/2009 | Mazzaferri | 709/202 |
| 2010/0100839 A1 * | 4/2010 | Tseng et al. | 715/780 |
| 2010/0180338 A1 * | 7/2010 | Stewart et al. | 726/19 |

OTHER PUBLICATIONS

"Playing with the Keyboard", Retrieved at<<http://classicteck.com/rbarticles/mackeyboard.php>>, pp. 5.
"Microsoft Remote Desktop Connection 2.0b1 description", Retrieved at<<http://mac.wareseeker.com/Utilities/ microsoft-remote-desktop-connection-2.0b1.zip/334362>>, pp. 3.
Zook Ken,"Keyboard input", Retrieved at<<http://fieldworks.sil.org/supportdocs/Keyboard%20input.doc>>, Nov. 22, 2008, pp. 10.
"How to Configure Your Laptop for a Remote Desktop Connection", Retrieved at<<http://www.dummies.com/how-to/ content/how-to-configure-your-laptop-for-a-remote-desktop-.navId-323059.html>>, pp. 4.
Gavage Cedric, "Microsoft Remote Desktop Connection for Mac+ keyboard layout", Retrieved at<<http://niddle. blogspot.com/2009/03/microsoft-remote-desktop-connection-for.html>>, Mar. 30, 2009, pp. 2.

* cited by examiner

*Primary Examiner* — Henry Tsai
*Assistant Examiner* — Jing-Yih Shyu

(57) ABSTRACT

A method for processing keystrokes is described herein. A first keystroke representing a symbol for a first operating system may be received on a first computer. The first keystroke may be translated to a second keystroke representing the symbol for a second operating system on a second computer. The second operating system is different from the first operating system. The second keystroke may be sent to the second computer.

6 Claims, 4 Drawing Sheets

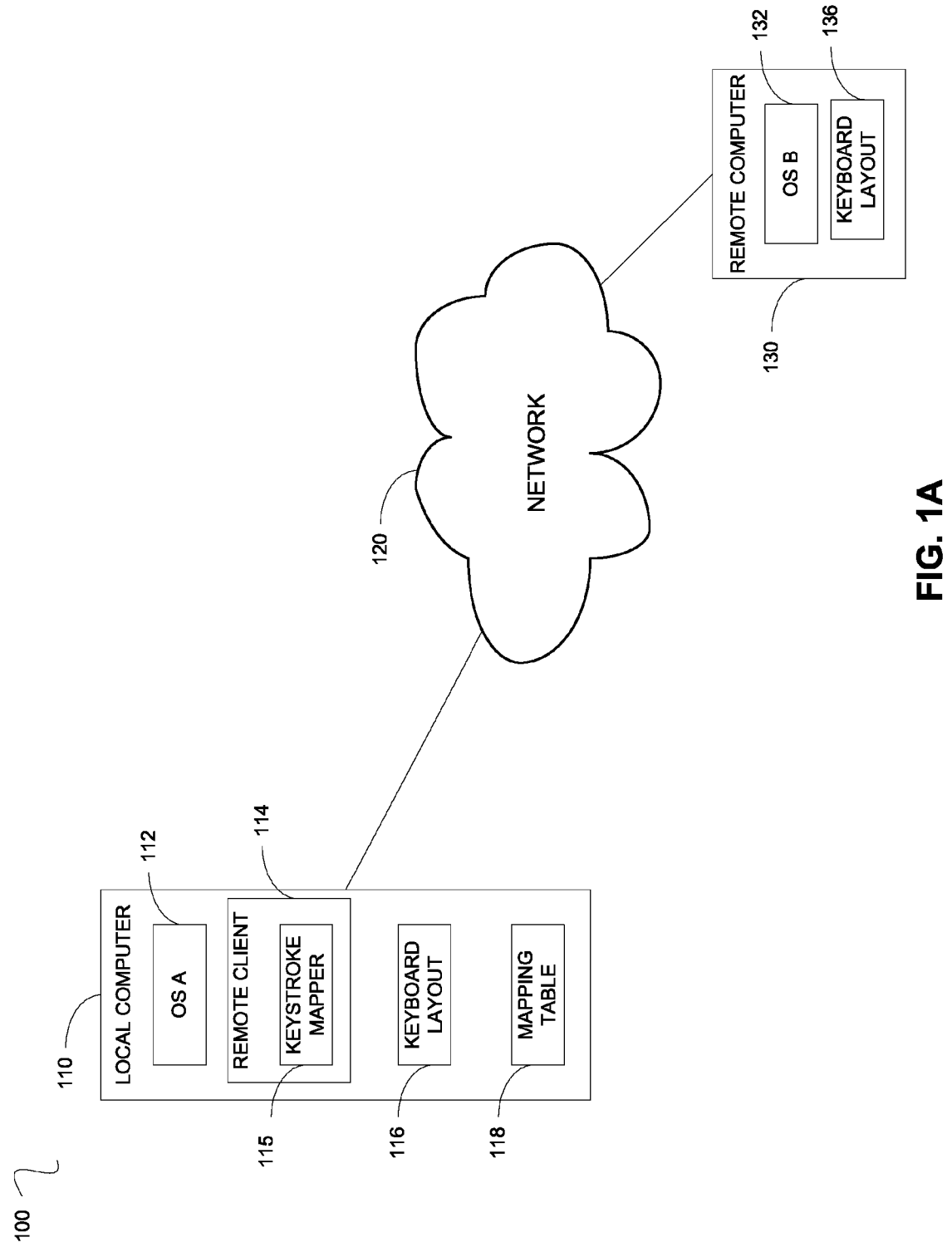

| OPERATING SYSTEM A MODIFIER KEY(S) | OPERATING SYSTEM A REGULAR KEY | OPERATING SYSTEM B MODIFIER KEY(S) | OPERATING SYSTEM B REGULAR KEY |
|---|---|---|---|
| SHIFT | "1" | SHIFT | "1" |
| NONE | "\" | CTRL,ALT | "\" |

FIG. 3

ADAPTIVE KEYBOARD LAYOUT MAPPING

BACKGROUND

The computer laptop is an innovation that enables computer users on the go to perform computer-related tasks when they do not have access to their desktop computers. Because memory is more limited on the laptop than the desktop, the computer user may keep a limited set of computer applications and files on the laptop. Further, the computer user may copy files from the desktop onto the laptop to prepare for a particular task.

However, unless the computer user foresees exactly what work or tasks are to be performed, the laptop in and of itself may not substitute for access to the desktop computer. Instead, the computer user may use remote desktop software to remotely access the desktop computer from another computer. In this way, the computer user may do work, or other computer-related tasks, without having to plan ahead by copying files or applications from the desktop to the laptop.

The remote desktop software may send each keystroke entered on the local computer to the remote computer. The remote computer may then process the keystrokes as if entered on a keyboard attached to the remote computer and maps the keystrokes to symbols to be displayed. Those symbols are then displayed on a screen attached to the local computer.

SUMMARY

Described herein are implementations of various technologies for adaptive keyboard layout mapping. Using remote desktop software on a local computer having a first operating system (OS), a user may remotely operate a remote computer having a second operating system (OS), where the second OS is different from the first OS. During the remote desktop session, the user may change a keyboard layout setting that enables the user to produce foreign symbols on the local display that may not be available on the physical keyboard. The keyboard layout may map potential keystrokes entered on the local computer to the symbols of the foreign language.

As each keystroke is entered on the local computer, a lookup operation may be performed. The lookup operation may determine a corresponding keystroke entered on the remote computer that produces the same symbol produced by the keystroke entered on the local computer. The corresponding keystroke may be sent to the remote computer. The remote computer may process the corresponding keystroke to produce the symbol, and send the symbol to the local computer for display.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

FIG. 1A is a block diagram illustrating a remote desktop system in which the various technologies described herein may be incorporated and practiced.

FIG. 3 illustrates a mapping table in accordance with implementations of various techniques described herein.

DETAILED DESCRIPTION

Figure 1B:
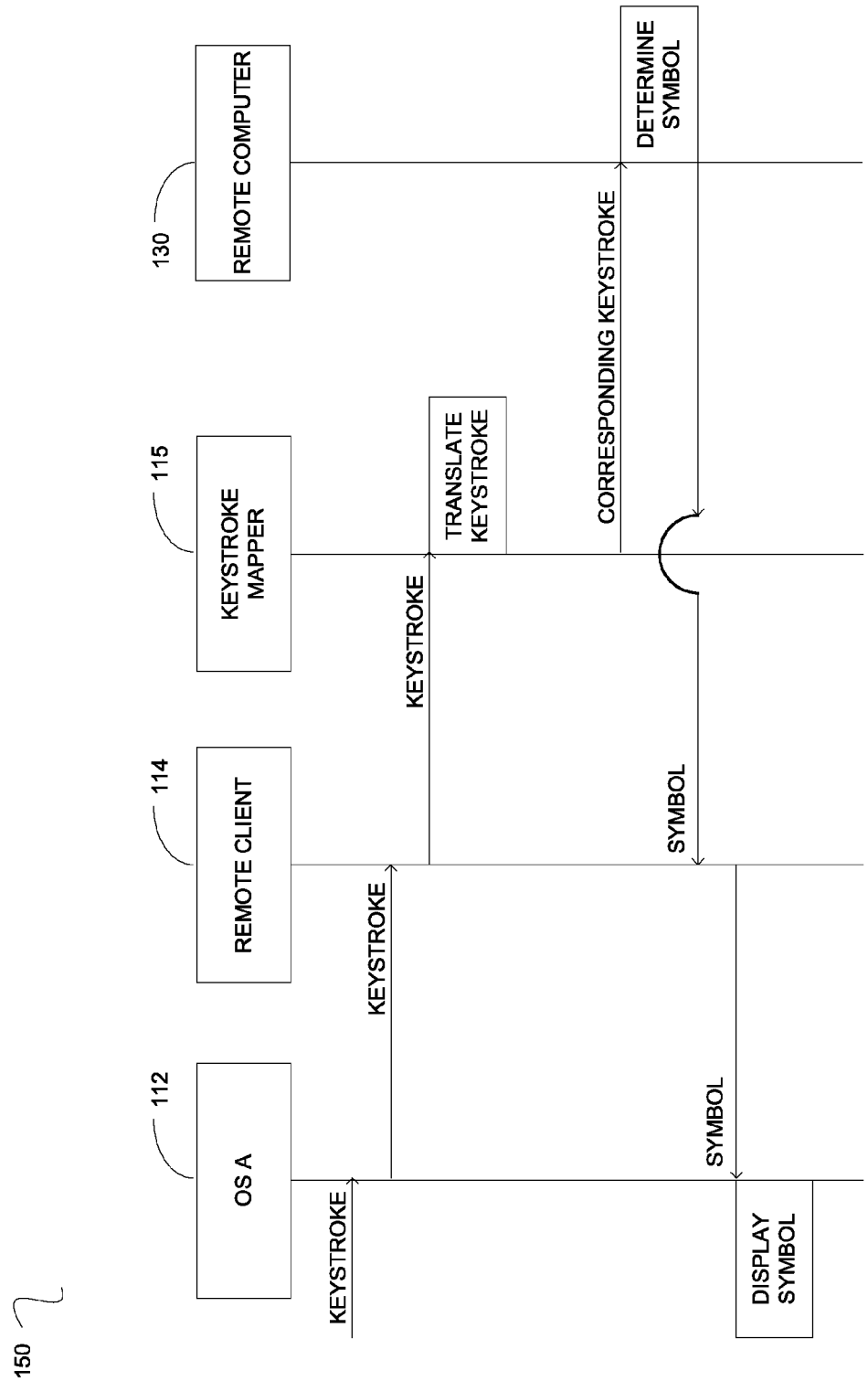
FIG. 1B is a message flow diagram illustrating a remote desktop transaction in accordance with various implementations of the technologies described herein.

In general, one or more implementations of various technologies described herein are directed towards adaptive keyboard layout mapping. The various implementations will be described in more detail in the following paragraphs.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

FIG. 1A is a block diagram illustrating a remote desktop system 100 in which the various technologies described herein may be incorporated and practiced. The remote desktop system 100 may include a local computer 110 and a remote computer 130 exchanging communications over a network 120. The network 120 may be any network or collection of networks that facilitates secure computer communications. In one implementation, the network 120 is a virtual private network (VPN) connected over the Internet.

The local computer 110 may include an operating system A 112, a remote client 114, a keyboard layout 116, and a mapping table 118. The operating system A 112 may be any suitable operating system that may control the operation of a networked personal or server computer, such as Windows Vista® operating system, Mac OS® X operating system, Unix® operating system variants (e.g., Linux® operating system and BSD® operating system), and the like.

The remote computer 130 may also include an operating system, operating system B 132. The operating system B 132 on the remote computer 130 may be distinct from the operating system A 112 on the local computer 110. In one implementation, the operating system A 112 may be a Mac® operating system, and the operating system B 132 may be a Windows® operating system.

The remote client 114 may be software that enables a user to operate the remote computer 130 over the network 120 through the use of the local computer 110.

For example, the local computer 110 may be located in the user's home, and the remote computer 130 may be the user's computer at work. Through the use of the remote client 114, the user may operate the computer at work from home.

The remote client 114 may connect to the remote computer 130 during a remote desktop session. During this session, the user may operate the remote computer 130 using the local computer 110.

The keyboard layout 116 may map each possible keystroke on the local computer 110 to a particular set of symbols. For example, the keystroke consisting of the SHIFT key and the number "1" key may be mapped to the "!" symbol. Multiple keyboard layouts may be available for the user's selection. Keyboard layouts 116 may vary by language and OS. For example, a keyboard layout for United Kingdom English and the Windows® operating system may map a keystroke of the "\" key to the symbol for the sterling pound, "£."

The remote computer 130 may also include a keyboard layout 136. While the set of symbols produced by each of the keyboard layouts 116, 136 may be the same, the keystrokes that produce the symbols may differ.

To that end, the mapping table 118 may map the keystrokes in the keyboard layout 116 to corresponding keystrokes in the keyboard layout 136 that produce the same symbols. Similar to the keyboard layouts 116, 136, the mapping table 118 may be language-specific. In one implementation, there may be multiple mapping tables, including one mapping table 118 for each language. The mapping table 118 is described in greater detail with reference to FIG. 3.

The remote client 114 may include a keystroke mapper 115. The keystroke mapper 115 may be software that uses the mapping table 118 to translate a keystroke entered on the local computer 110 to the corresponding keystroke on the remote computer 130.

FIG. 1B is a message flow diagram 150 illustrating a remote desktop transaction in accordance with various implementations of the technologies described herein. The remote client 114 may enable the user to operate the remote computer 130 through a series of transactions, i.e., communications, between the local computer 110 and the remote computer 130 during a session. The transaction illustrated in the message flow diagram 150 involves the processing of a keystroke received on the local computer 110.

The operating system A 112 may receive a keystroke from a keyboard (not shown) attached to the local computer 110. The operating system A 112 may send the keystroke to the remote client 114 for processing. In turn, the remote client 114 may send the keystroke to the keystroke mapper 115. Upon receiving the keystroke, the keystroke mapper 115 may translate the keystroke to the corresponding keystroke for the remote computer 130. The translation is described in greater detail with reference to FIG. 2. The keystroke mapper 115 may then send the corresponding keystroke to the remote computer 130.

Upon receiving the corresponding keystroke, the remote computer 130 may determine the symbol that the corresponding keystroke produces. The remote computer 130 may then send the symbol to the remote client 114. The remote client 114 may then send the symbol to the operating system A 112. In response, the operating system A 112 may display the symbol on a computer screen (not shown) attached to the local computer 110.

Figure 2:
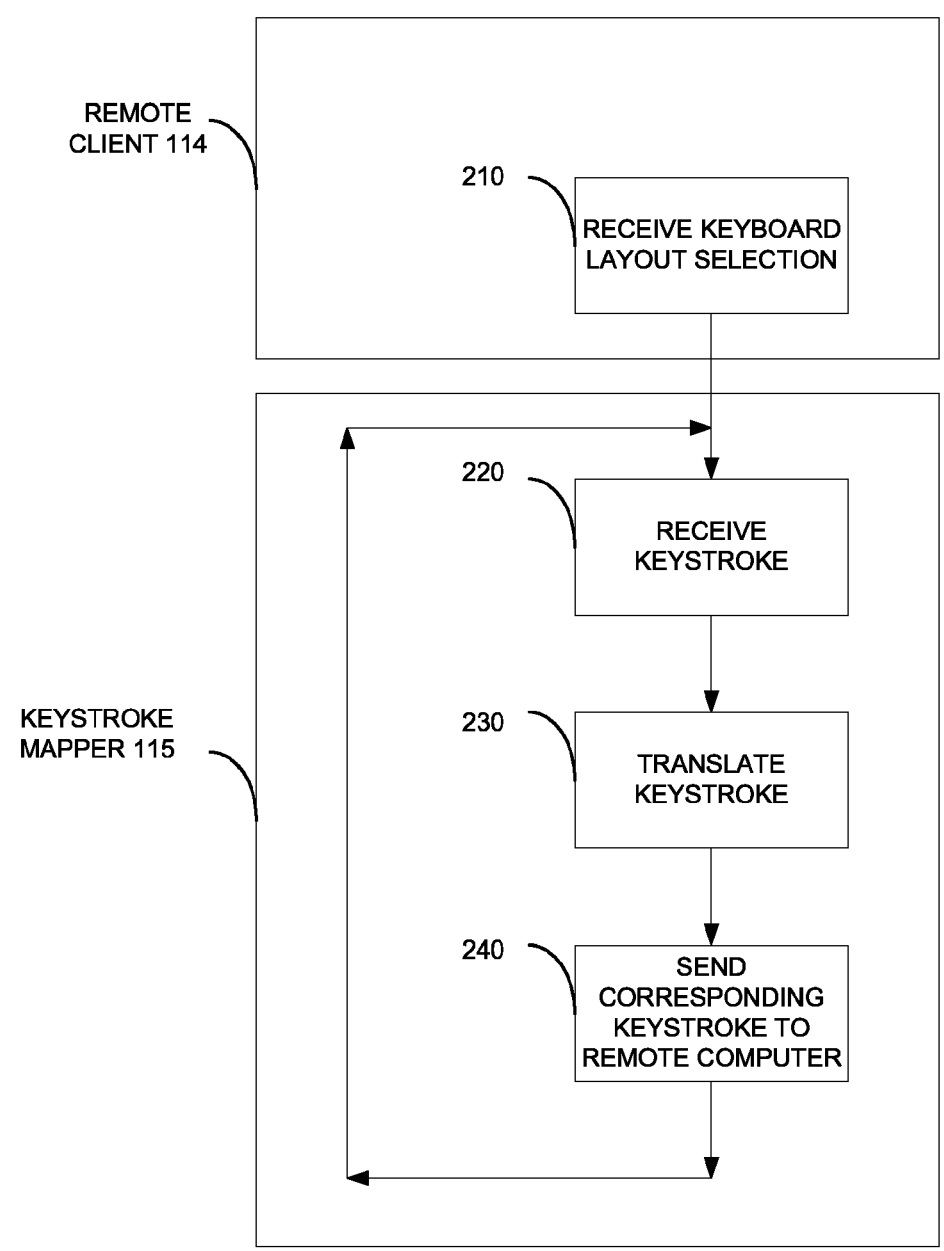
FIG. 2 is a flow chart illustrating a method for adaptive keyboard layout mapping in accordance with various implementations of the technologies described herein.

FIG. 2 is a flow chart illustrating a method 200 for adaptive keyboard layout mapping in accordance with various implementations of the technologies described herein. The remote client 114 and the keystroke mapper 115 may perform method 200. It should be understood that while the flow chart indicates a particular order of execution, in some implementations, certain steps of method 200 may be executed in a different order.

At step 210, the remote client 114 may receive a keyboard layout selection. The selection may be received from the user as a default keyboard layout. In one implementation, the user may change the keyboard layout selection during the remote desktop session.

At step 220, the keystroke mapper 115 may receive a keystroke. The keystroke may be entered by the user on the keyboard attached to the local computer 110.

At step 230, the keystroke mapper 115 may translate the keystroke to the corresponding keystroke for the remote computer 130. In one implementation, the keystroke mapper 115 may lookup the corresponding keystroke in the mapping table 118. As stated previously, the mapping table 118 may be language-specific. As such, the keystroke mapper 115 may perform the lookup in the mapping table 118 for the language that corresponds to the language for the selected keyboard layout 116.

At step 240, the keystroke mapper 115 may send the corresponding keystroke to the remote computer 130. Upon receiving the corresponding keystroke, the remote computer 130 may process the corresponding keystroke as described with reference to FIG. 1B.

FIG. 3 illustrates a mapping table 118 in accordance with implementations of various techniques described herein. The mapping table 118 may include rows 301, 302, populated with values for operating system A modifier key(s) 310, operating system A regular key 320, operating system B modifier key(s) 330 and operating system B regular key 340.

Each row in the mapping table 118 may represent a potential keystroke entered on the local computer 110 and its translation to a corresponding keystroke for the remote computer 130.

A keystroke may include one or more modifier keys and a regular key. In computing, a modifier key is a special key on a computer keyboard that modifies the normal action of another key when pressed in combination. For example, the modifier key, SHIFT, in combination with the "1" key, produces a "!" symbol, instead of the "1" symbol. Modifier keys may include one or more of a set of keys such as CTRL, ALT, SHIFT, COMMAND, OPTION, and the like. Regular keys may be any other key on the keyboard that produces symbols such as letters, number and character keys, like "a," "1" and "\."

The combination of modifier keys and a regular key produce the symbol associated with the keystroke in the keyboard layouts 116, 136. It should be noted that certain keystrokes may not include a modifier key, as is the case for symbols like lower-case letters, numbers, and certain characters. In one implementation, the mapping table 118 may include the symbol. In the implementation where there is one mapping table 118 used, the mapping table 118 may include identifiers for the operating systems and the languages.

In one implementation, keystrokes may be functional, instead of symbolic. A functional keystroke may cause the remote computer 130 to perform a function, instead of producing the symbol. For example, the F1 key is functional. In the Windows® operating system, pressing the F1 key performs the function of opening a help window.

Functional keystrokes may include modifier key, regular key and function key combinations. For example, in the Windows® operating system, the modifier key, CTRL, in combination with the regular key, W, performs the function of closing the currently opened window. Those skilled in the art know a multitude of functional keystrokes are possible, including user-defined functions, modifier keys in combination with function keys, etc.

In such an implementation, the keyboard layouts may map keystrokes to functions; similarly, the mapping table 118 may include identifiers of the functions. Further, in response to the user entering a functional keystroke on the local computer 110, the keystroke mapper 115 may translate the functional keystroke, send the translated keystroke to the remote computer, and the remote computer 130 may perform the function, e.g., open the help window. The help window (or other output of a function) may be displayed on the local computer 110, similar to displaying symbols for symbolic keystrokes.

The operating system A modifier key(s) 310 and operating system A regular key 320 may represent the keystroke entered by the user on the local computer 110. The operating system B modifier key(s) 330 and operating system B regular key 340 may represent the corresponding keystroke sent to the remote computer 130 by the keystroke mapper 115.

The combination of operating system A modifier key(s) 310 and operating system A regular key 320 may be associated with a symbol within the keyboard layout 116. Similarly, the combination of operating system B modifier key(s) 330 and operating system B regular key 340 may be associated with a symbol within the keyboard layout 136.

In some cases, the keystroke for a symbol on the local computer 110 may be the same as the corresponding keystroke on the remote computer 130. As shown in the row 301, the keystroke and corresponding keystroke are the same for the "!" symbol: a modifier key of SHIFT, and a regular key of "1."

However, the keystroke and the corresponding keystroke are not typically the same, particularly when the local computer and the remote computer have different operating systems. For example, row 302 represents a translation for the keystroke that produces the symbol for the sterling pound. The keystroke on the local computer 110 includes the operating system A modifier key(s) 310 of NONE (no modifier key entered), and an operating system A regular key 320 of "\." The corresponding keystroke for the remote computer 130 includes the operating system B modifier key(s) 330 of CTRL and ALT, and an operating system B regular key 340 of "\."

One or more programs that may implement or utilize the various technologies described herein may use an application programming interface (API), reusable controls, and the like. Such programs may be implemented in a high level procedural or object oriented programming language to communicate with a system. However, the program(s) may be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   generating by a local computer a first keystroke representing a symbol according to a keyboard layout of the local computer, the first keystroke produced by operation of a symbol key and at least one modifier key;
   translating the first keystroke by the local computer to a second keystroke representing the symbol according to a different keyboard layout of a remote computer by performing a lookup operation in a mapping table that maps local computer keystrokes to remote computer keystrokes;
   sending the second keystroke to the remote computer for processing;
   receiving the symbol from the remote computer after the second keystroke has been processed by the remote computer to generate the symbol; and
   displaying the received symbol by the local computer.

2. The method of claim 1, wherein the keyboard layout of the local computer is specific to a language.

3. The method of claim 1, wherein the keyboard layout of the local computer is specific to an operating system of the local computer, and the different keyboard layout of the remote computer is specific to an operating system of the remote computer.

4. The method of claim 1, wherein the mapping table is specific to a language.

5. A system, comprising:
   a first computer having
      a first processor; and
      first memory storing an operating system and program instructions executable by the first processor to:
      receive a first keystroke representing a symbol according to a keyboard layout associated with the first operating system, wherein the first keystroke comprises operation of a symbol key and a modifier key;
      translate the first keystroke to a second keystroke according to a different keyboard layout by performing a lookup operation in a mapping table that maps operation of the symbol key and the modifier key to one or more keys according to the different keyboard layout;
      transmit the second keystroke to a second computer;
      receive the symbol produced by processing the second keystroke by the second computer; and
      display the received symbol on a screen of the first computer.

6. The system of claim 5, further comprising:
   the second computer in communication with the first computer to receive the second keystroke;
   the second computer comprising second memory storing:
   an operating system associated with the different keyboard layout; and
   program instructions executable by the second computer to:
   receive the second keystroke;
   process the second keystroke to generate the symbol; and
   send the symbol to the first computer.

* * * * *